Nov. 8, 1932.　　　　　A. R. MORRILL　　　　1,887,136
AUTOMATIC SHOE MACHINE
Filed Nov. 23, 1927.　　10 Sheets-Sheet 1

Nov. 8, 1932.                A. R. MORRILL                 1,887,136
                         AUTOMATIC SHOE MACHINE
                    Filed Nov. 23, 1927        10 Sheets-Sheet 3

Witness
Jas. J. Maloney

Inventor
Alfred R. Morrill
by Van Everen Fish
Hildreth Heavy
Attys.

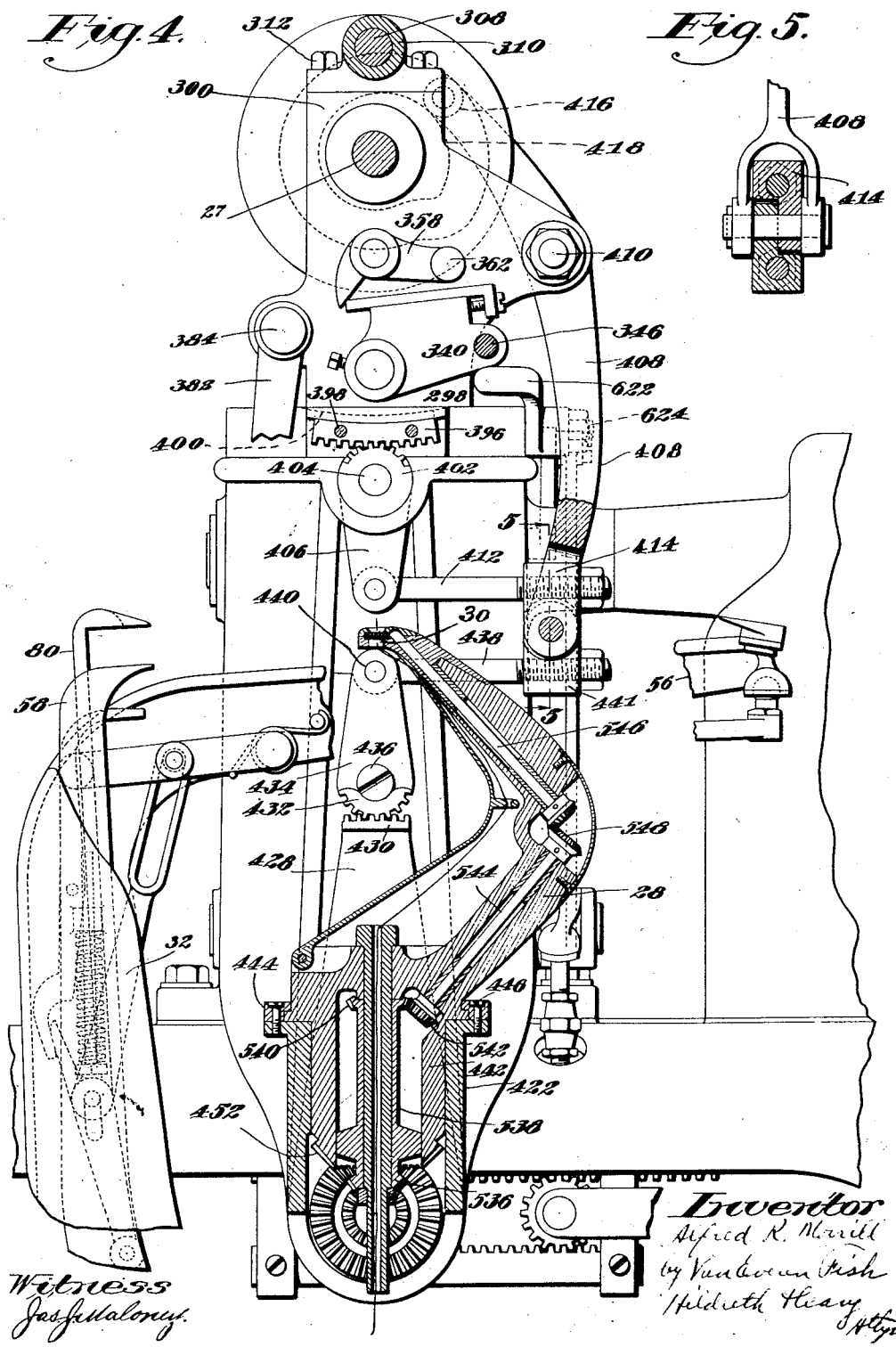

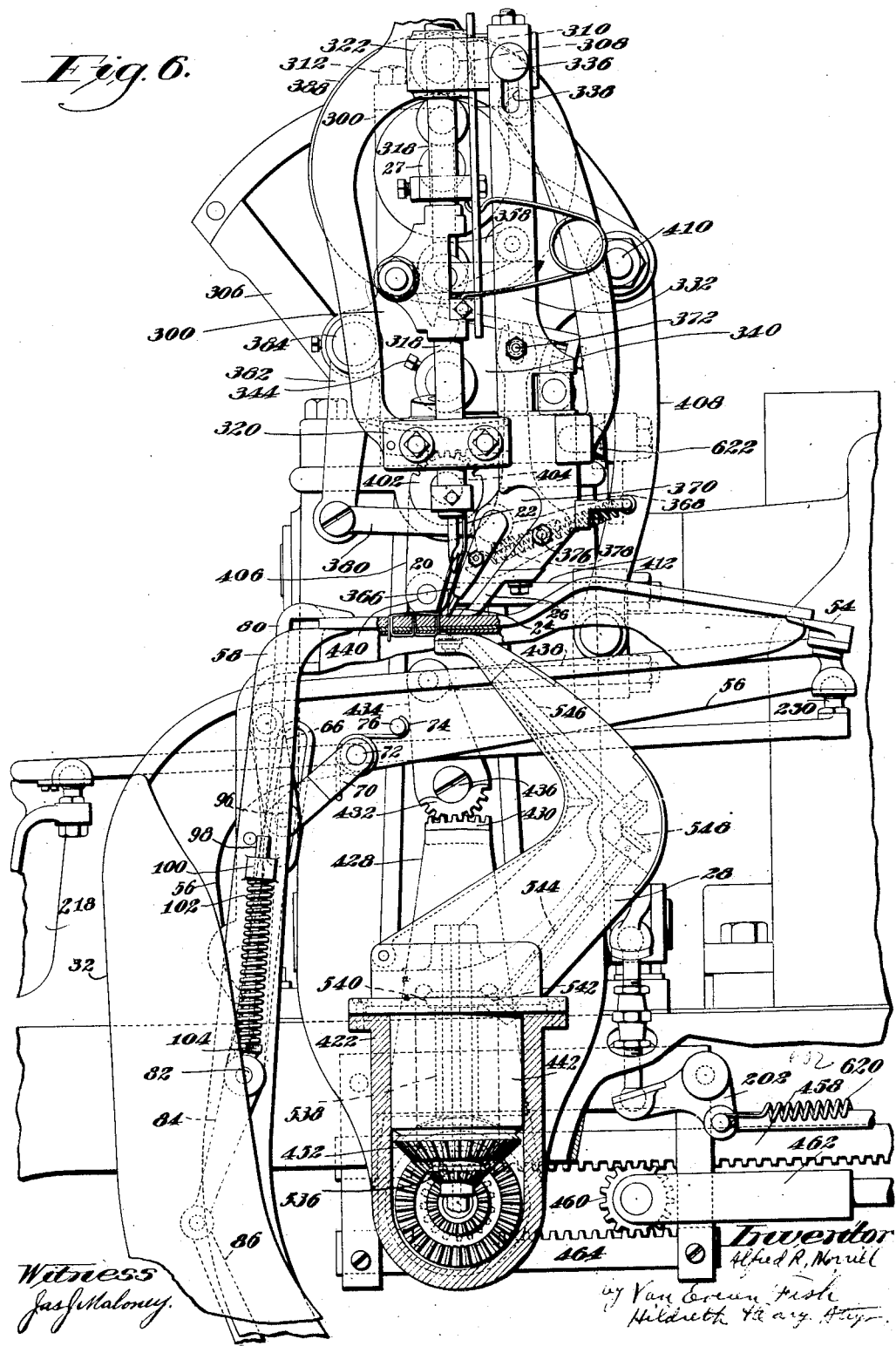

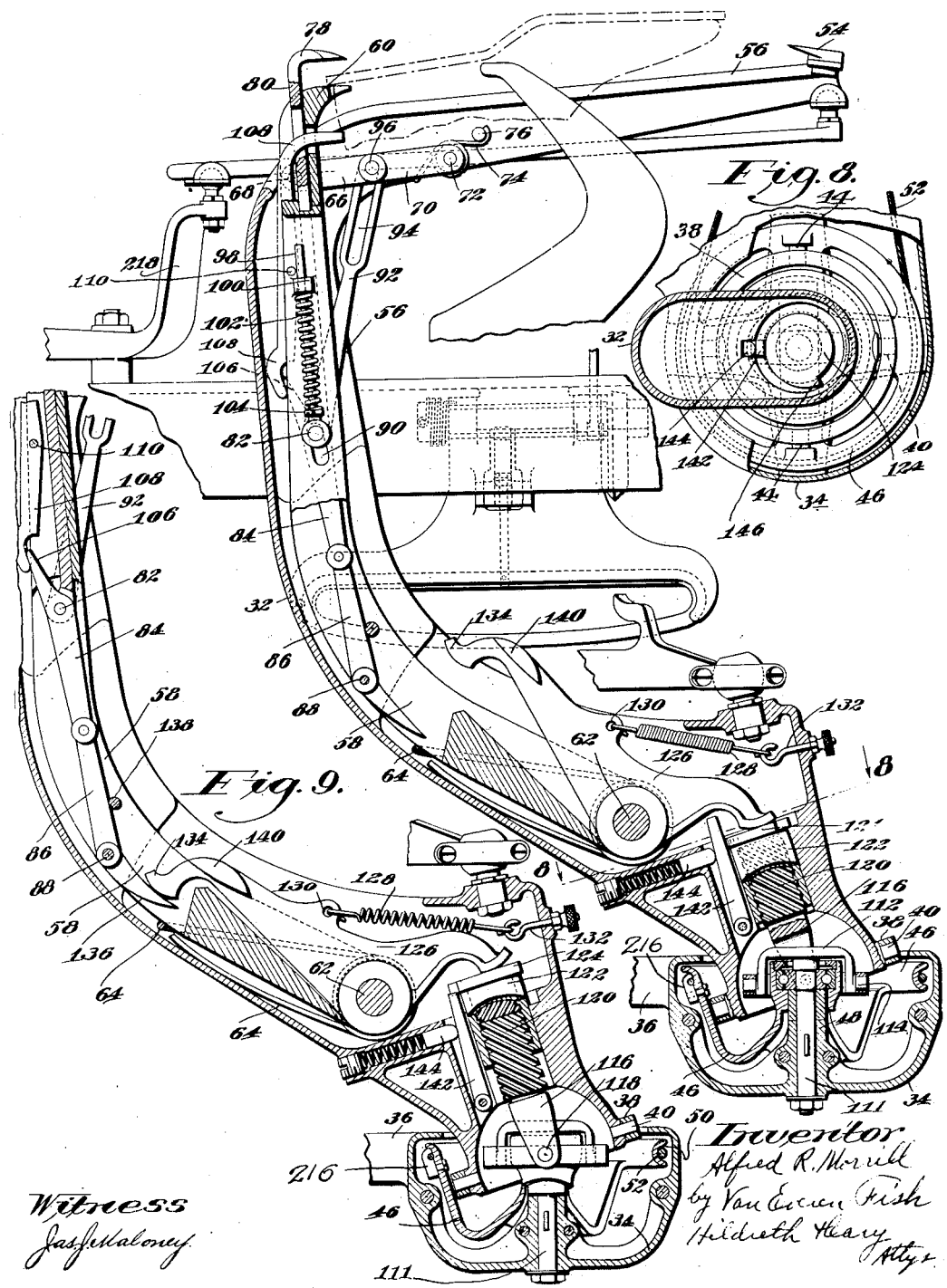

Nov. 8, 1932.   A. R. MORRILL   1,887,136
AUTOMATIC SHOE MACHINE
Filed Nov. 23, 1927   10 Sheets-Sheet 7

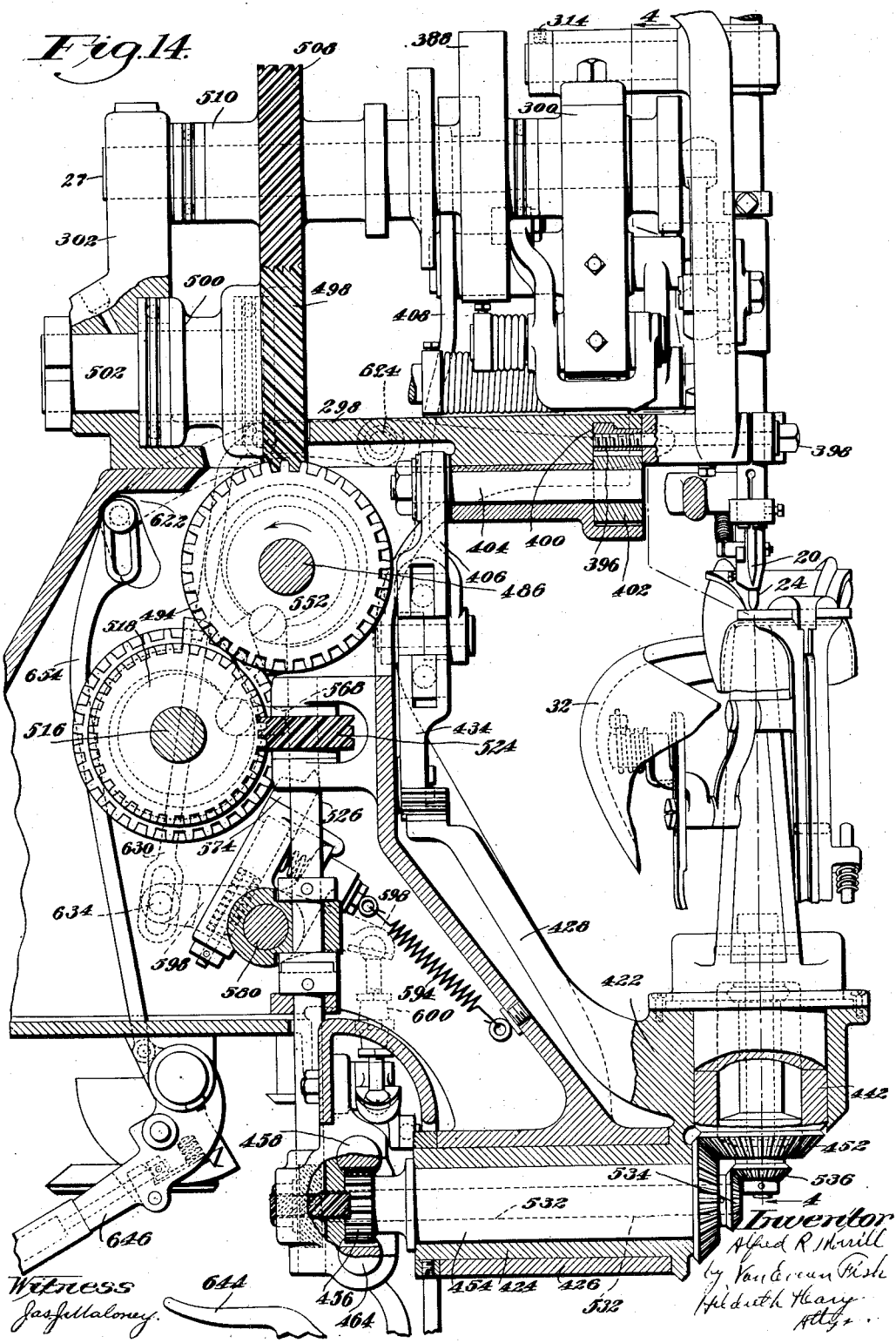

Nov. 8, 1932.  A. R. MORRILL  1,887,136
AUTOMATIC SHOE MACHINE
Filed Nov. 23, 1927   10 Sheets-Sheet 9

Witness
Jas. J. Maloney.

Inventor
Alfred R. Morrill
by Van Everen Fish
Hildreth Heavy
Attys.

Nov. 8, 1932.  A. R. MORRILL  1,887,136
AUTOMATIC SHOE MACHINE
Filed Nov. 23, 1927  10 Sheets-Sheet 10

Patented Nov. 8, 1932

1,887,136

UNITED STATES PATENT OFFICE

ALFRED R. MORRILL, OF BEVERLY, MASSACHUSETTS, ASSIGNOR TO UNITED SHOE MACHINERY CORPORATION, OF PATERSON, NEW JERSEY, A CORPORATION OF NEW JERSEY

AUTOMATIC SHOE MACHINE

Application filed November 23, 1927. Serial No. 235,369.

The present invention relates to automatic shoe machines and is herein shown as embodied in a horn sewing machine for sewing the outsoles to the insoles and associated uppers of so-called McKay shoes. In this machine the shoe is supported upon a jack and the jack and the sewing mechanism are moved relatively to transfer the point of operation about the shoe, and to change the relative positions of the shoe and the operating means to cause the shoe to be presented properly to the operating means as the point of operation is transferred about the shoe, all of the relative movements of the shoe and the operating means being produced and controlled by automatically acting mechanism.

Figure 1:
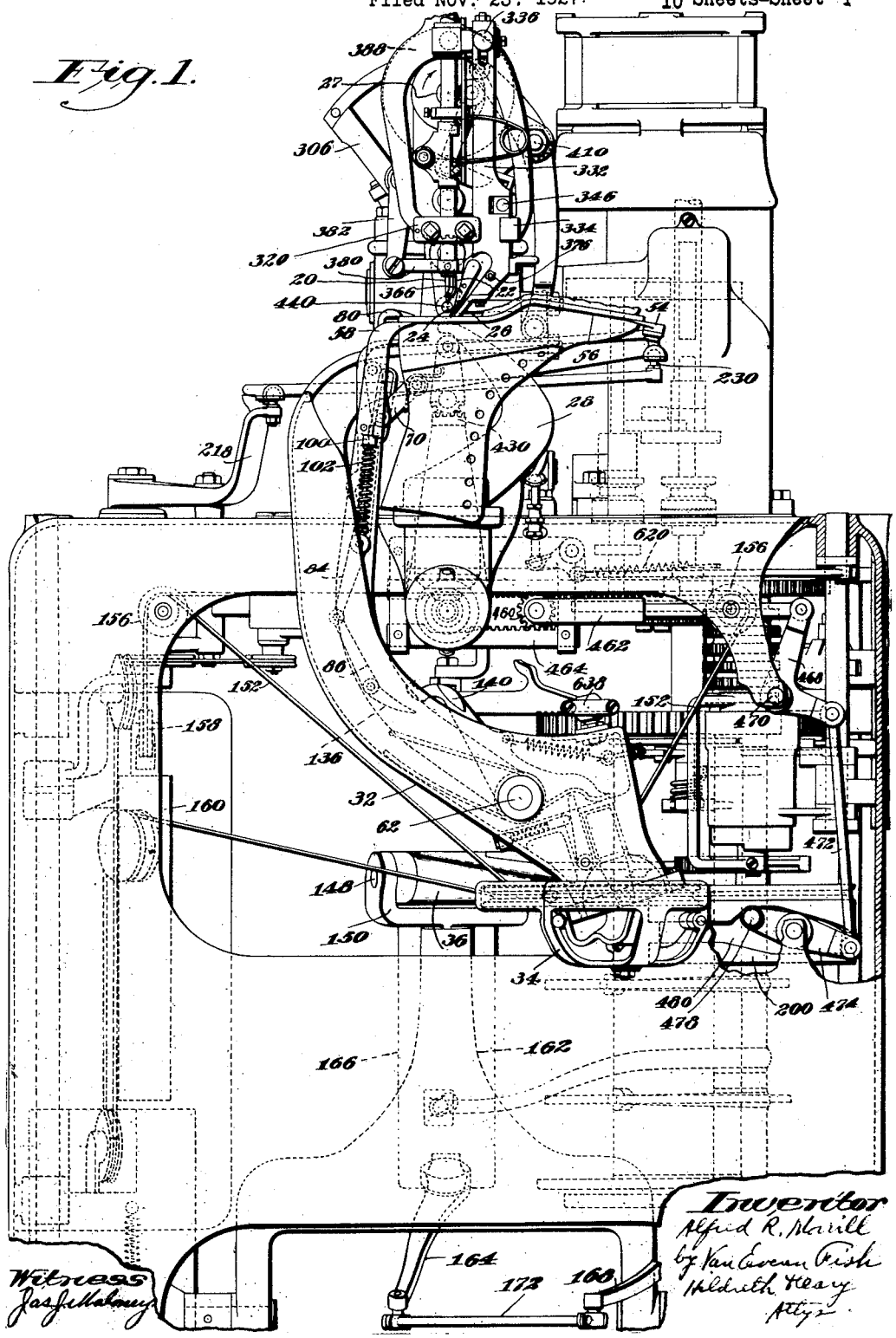
Figure 2:
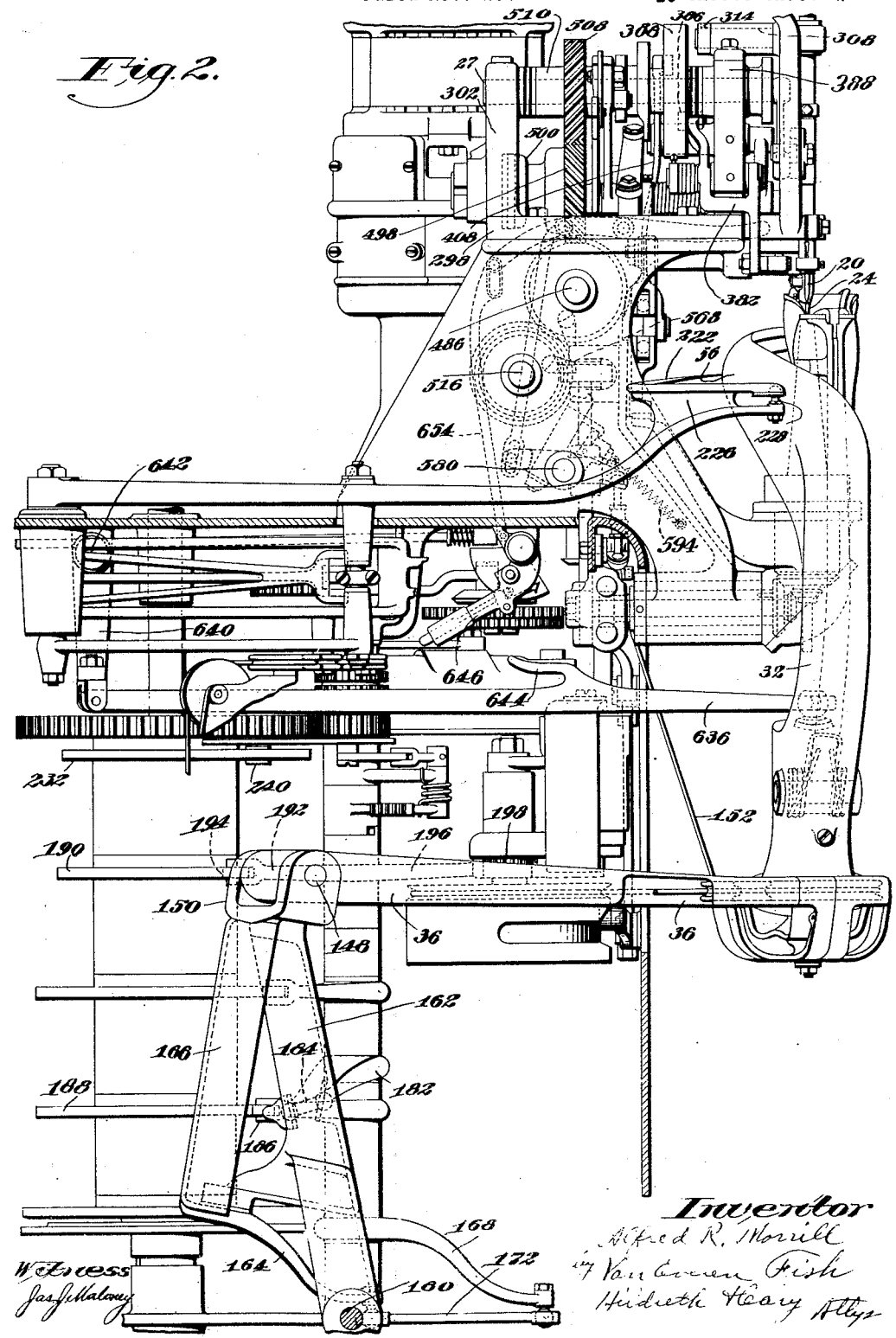
Figure 3:
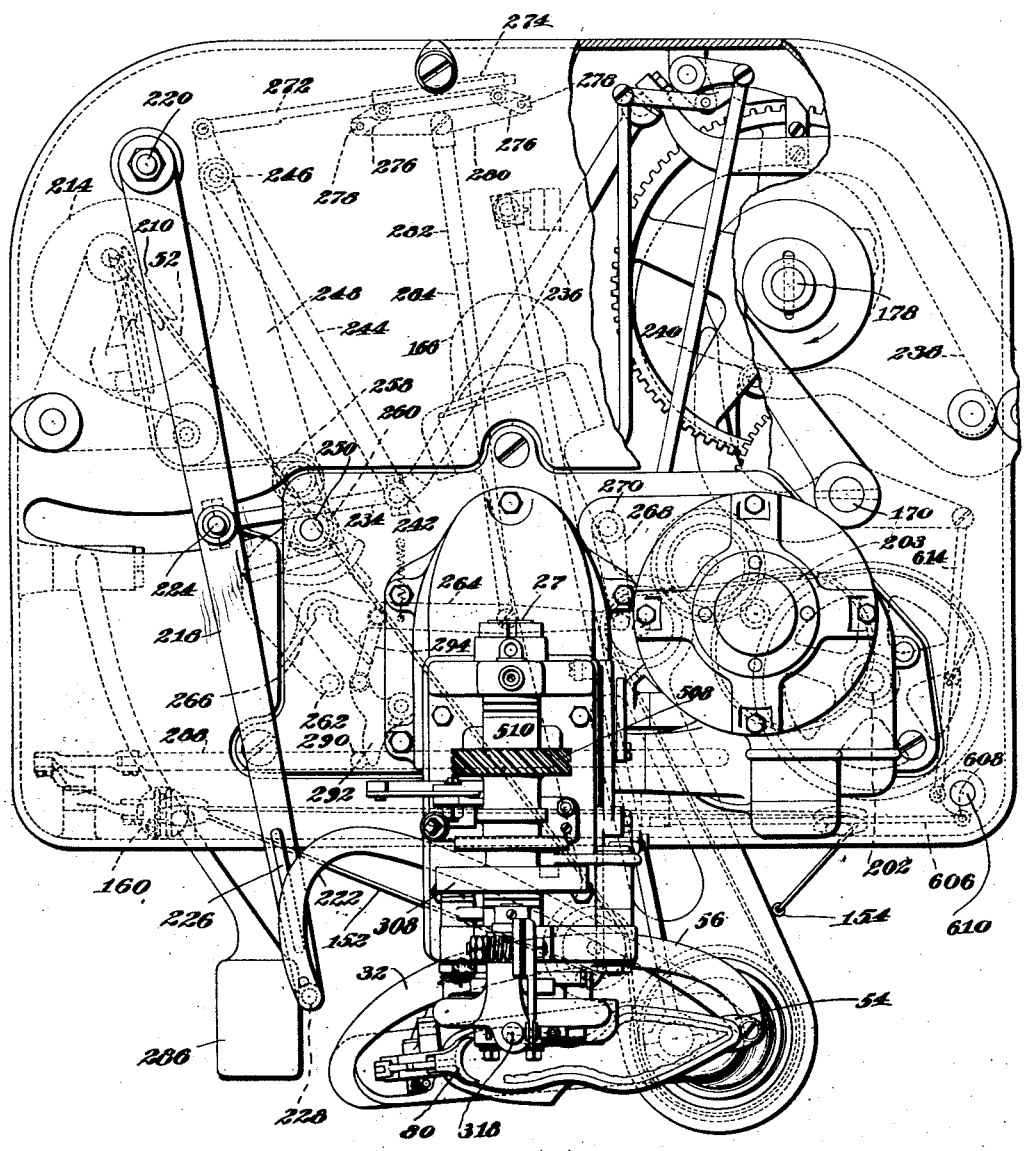
Figure 10:
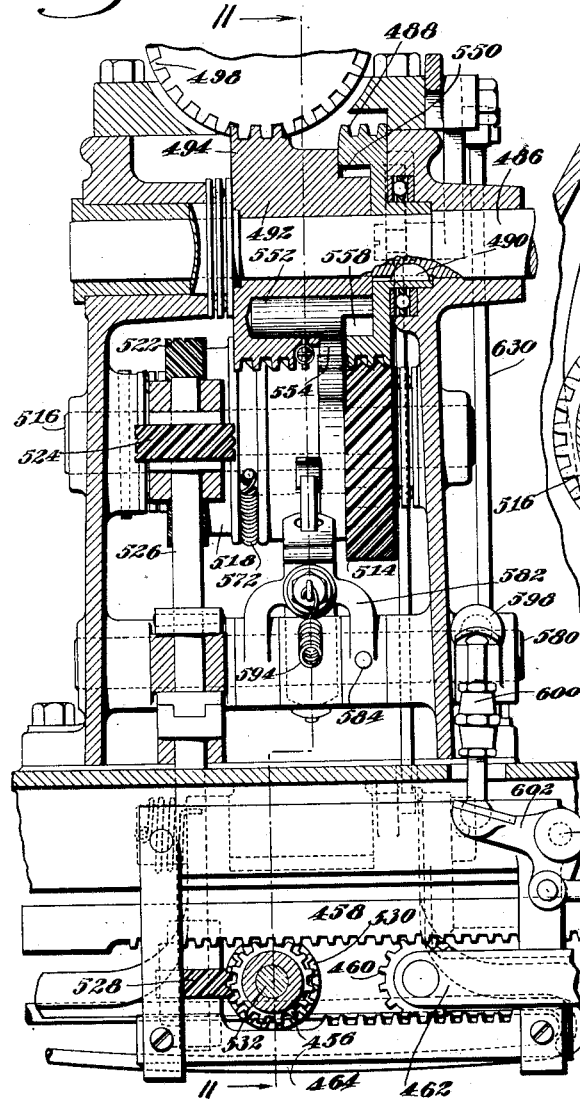
Figure 11:
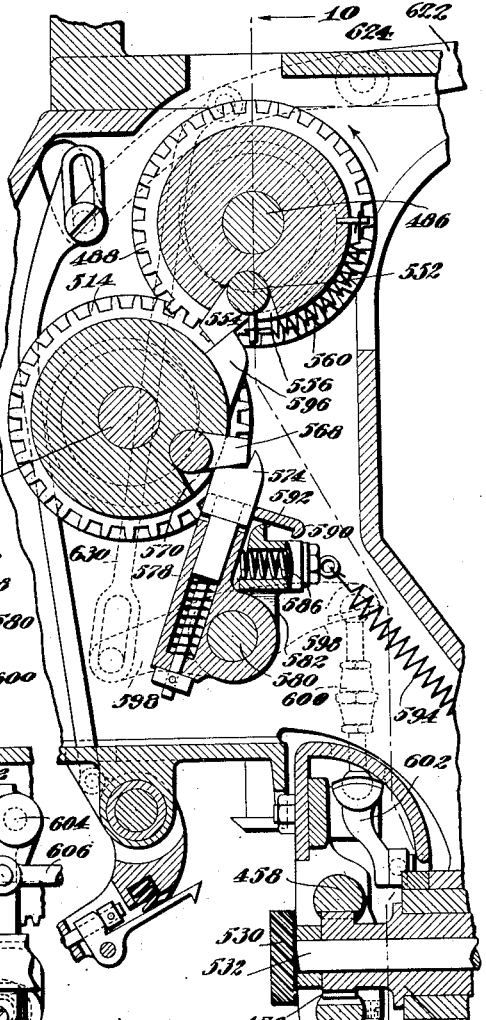
Figures 12, 13:
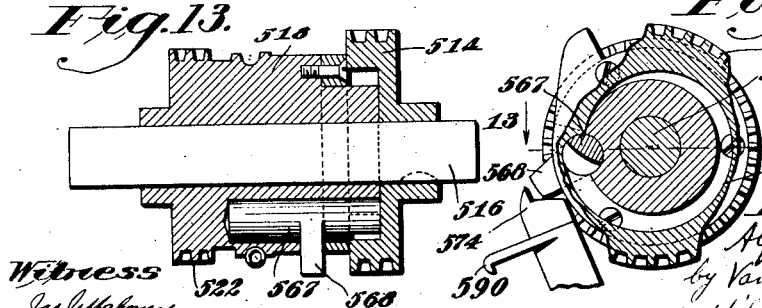
Figure 15:
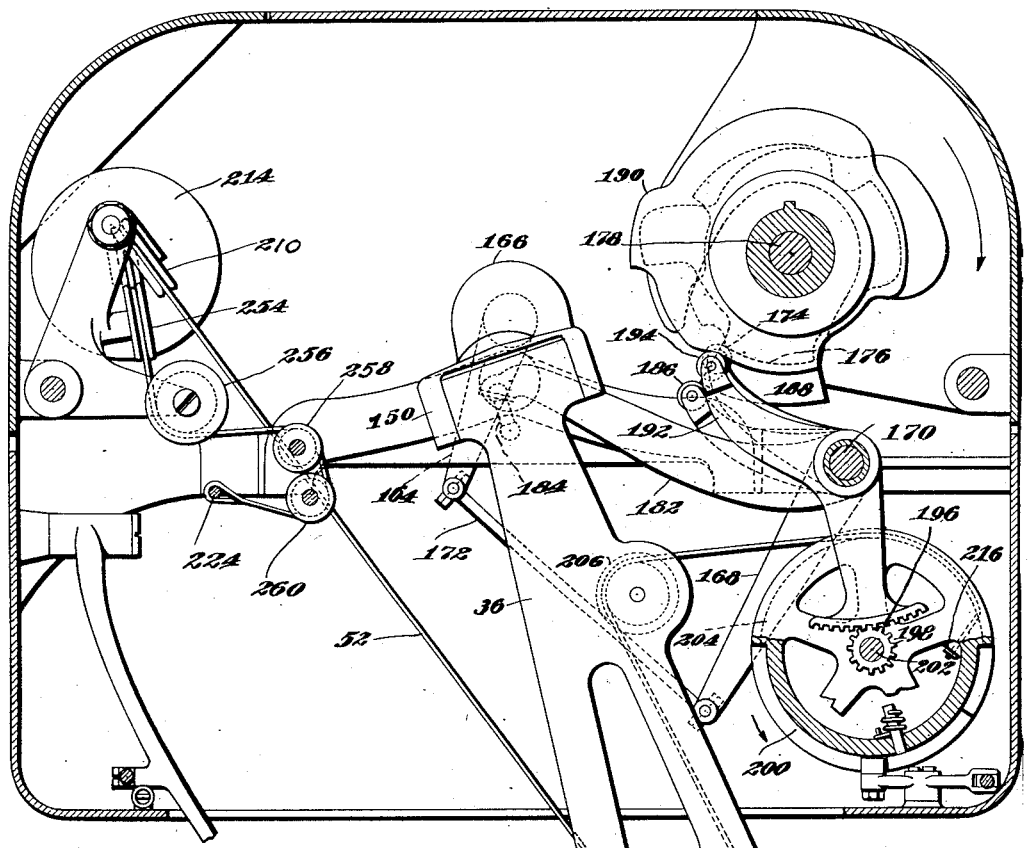
Figure 16:
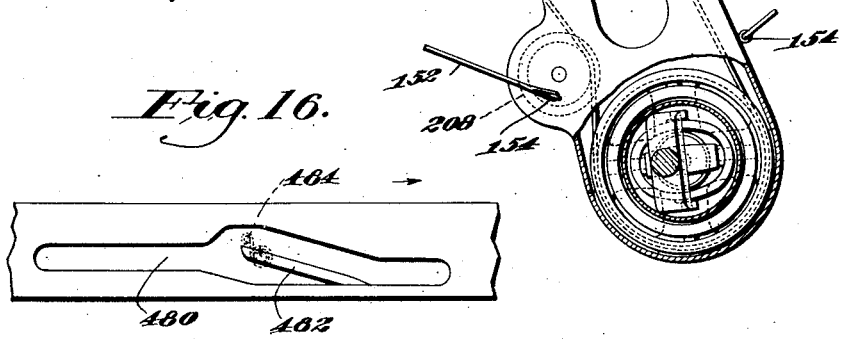
Figure 17:
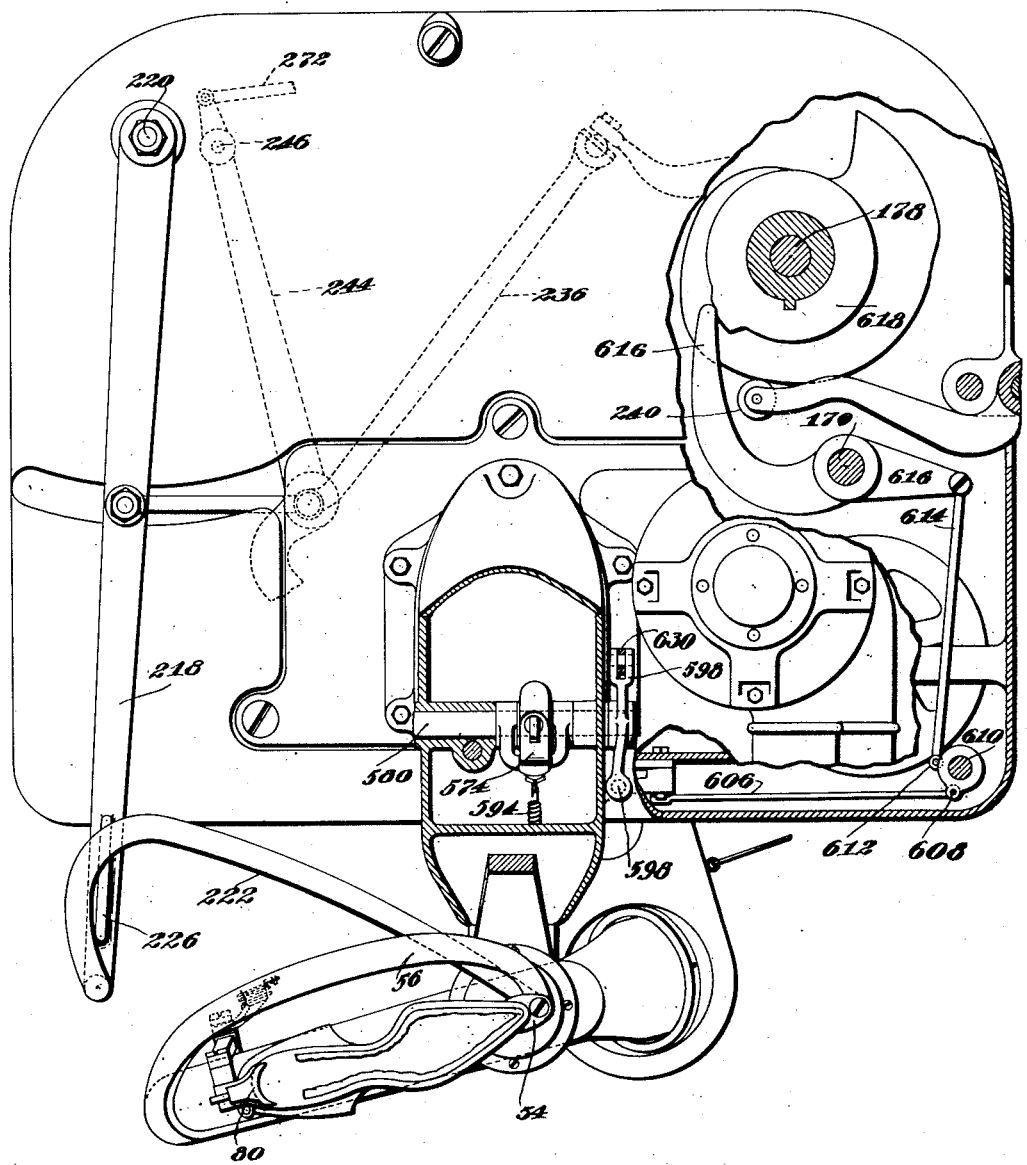

The several features of the invention consist in the devices, combinations and arrangement of parts hereinafter described and claimed, the advantages of which will be readily understood by those skilled in the art from the following description taken in connection with the accompanying drawings, in which Fig. 1 is a view in front elevation of one embodiment of the invention in an automatic McKay horn shoe sewing machine; Fig. 2 is a view of the machine in side elevation with a portion of the casing broken away; Fig. 3 is a plan view of the machine; Fig. 4 is a view in front elevation partly in section, on the line 4—4 of Fig. 14 illustrating particularly the mechanism for oscillating the sewing head and the horn about their pivots to secure a continuous feed of the work; Fig. 5 is a detail view partly in section taken on the line 5—5 of Fig. 4; Fig. 6 is a view in front elevation partly in section of the machine with the needle withdrawn from the work preparatory to forming a new stitch; Fig. 7 is a front view partly in section of the jack in open position; Fig. 8 is a detail sectional plan view taken on the line 8—8 of Fig. 7; Fig. 9 is a front view partly in section of certain of the parts shown in Fig. 7 illustrating the operation of the mechanism for automatically opening the jack to release a shoe on which the sewing operation has been performed; Fig. 10 is a view taken on the line 10—10 of Fig. 11 illustrating particularly stopping devices in the driving connections for the sewing cam shaft and the whirl; Fig. 11 is a view taken on the line 11—11 of Fig. 10; Fig. 12 is a detail view in right side elevation partly in section, illustrating the clutch in the driving connections for the whirl; Fig. 13 is a detail sectional plan view taken on the line 13—13 of Fig. 12; Fig. 14 is a view in left side elevation of the machine, partly in section, illustrating particularly the clutches and driving mechanism for the whirl and the sewing cam shaft; Fig. 15 is a plan view illustrating certain parts of the mechanism for controlling the movements of the jack; Fig. 16 is a developed view of the cam for turning the horn during the sewing operation; and Fig. 17 is a plan view of the machine with portions of the frame broken away and with parts omitted to show underlying structures.

The machine hereinafter specifically described as embodying the several features of the invention comprises a chain stitch sewing mechanism of the McKay type employing a straight hook needle and a whirl containing horn which extends within the shoe and is rotatable to assume at all times the most desirable position with relation to the work. This mechanism except as hereinafter described is similar in construction and in the general arrangement of the parts to that disclosed in the patent to E. P. Richardson, No. 710,612, dated October 7, 1902. In order to support the shoe and present it properly to the sewing mechanism without at the same time interfering with the movement of the horn within the shoe, a jack is provided which grips the shoe entirely from the outside at the heel and toe. The jack is actuated during the sewing operation by mechanism similar in general construction and mode of operation to that described in the patent to Laurence E. Topham and Alfred R. Morrill, No. 1,616,714, dated Feb. 8, 1927. In order to cooperate with the jack, to which a continuous movement is imparted by its actuating mechanism the sewing mechanism herein described is arranged to feed the work continuously, the horn and sewing devices being mounted for this purpose to swing back and forth in the line of feed in timed relation to the thrust of the needle, the backward movement of the horn and the frame carrying the sewing devices taking place during the forward feeding movement of the feed point. Inasmuch as the machine is designed to operate on sharp pointed shoes where the horn can not be pushed into the extreme tip of the toe, mechanism is provided for momentarily suspending the sewing at this point following the usual practice with manually controlled machines.

Referring specifically to the drawings the sewing elements include a straight hook needle indicated at 20, a cast off 22, feed point 24, and a presser foot 26 mounted on the head and driven from the sewing cam shaft 27, and a horn 28 containing a whirl of usual construction as indicated at 30.

The jack for supporting the shoe during the operation of the machine comprises a curved main arm 32 which carries the instrumentalities for grasping and releasing the shoe and is pivotally supported at its lower end on a casing 34 formed on one end of the lever arm 36. The jack is mounted on the gimbal ring 38 by means of the bearing pins 40 the ring in turn being pivoted to swing upon bearing pins 44 which are formed on the ring and at their outer ends engage bearings in a wheel 46. The common axis of the pins 40 is located substantially at right angles to the common axis of the bearing pins 44 to permit the jack to swing freely in any direction about its connections with the wheel 46. The wheel 46 is mounted to rotate on a vertical sleeve 48 formed in the casing 34 and has a groove 50 formed in its outer surface to receive a cord 52 for rotating the jack as the different sides of the shoe are presented to the sewing mechanism.

The position of the shoe on the jack is determined irrespective of its size by contact with a toe support 54 rigidly mounted on a curved arm 56 formed on the upper end of the arm 32 which comprises the main supporting column of the jack. The toe support 54 consists of a horizontally placed wedge adapted to fit into the recess between the sole and upper of the shoe and having a concave edge conforming approximately to the shape of the toe. The heel support consists of a lever arm 58 having at its upper end a wedge like projection 60 to rest against the heel portion of the upper adjacent to the sole and pivoted at its lower end on a stud 62 within the arm 32 near the base of the jack. A heavy spring 64 wrapped about the stud 62 with a loop resting against the arm 32 and with the ends bearing against the lever 58 tends to swing the lever towards the toe rest. The jack is maintained in open position against the pressure of this spring by means of a toggle lever having an arm 66 pivoted at 68 on the heel supporting lever 58 and an arm 70 pivotally mounted on a stud 72 on the arm 56. A spring 74 coiled about the stud 72 and anchored to the pin 76 tends to hold the toggle lever in its straightened position.

The shoe is clamped firmly to the heel support during the sewing operation by means of a clamp 78 formed on the upper end of a bar 80 which is adapted to slide vertically in guides formed in the lever 58 (see Figs. 1, 4, 6, 7 and 9). The bar is pivotally fastened at its lower end by a stud 82 to the lever 84 which forms one arm of a toggle lever, the lower arm 86 being pivoted at 88 on the lever 58. The stud 82 extends through a slot 90 in the lever 58 to give direction to the thrust of the upper end of the toggle. A link 92 is also fastened to the stud 82 and is connected by means of slot 94 to the connecting pin 96 of the two toggle arms 66 and 70. It will be seen that when the toggle joint formed by levers 84 and 86 is broken the stud 82 is depressed causing the clamp 78 to descend into clamping position and also acting to break the toggle joint of the levers 66 and 70 so that the heel supporting lever 58 will swing toward the toe rest under the influence of spring 64. A rod 98 pivotally mounted on the stud 82 and adapted to slide in a bracket 100 on the heel supporting lever 58 carries a compression spring 102 coiled about it between the bracket 100 and a shoulder 104 on the rod in order to force the stud 82 downward when the toggle composed of levers 84 and 86 is broken and also to exert a clamping pressure on the clamp 78. The mechanism for breaking the toggle comprises an arm 106 on the toggle lever 84 which is adapted to engage with a lever 108 pivoted at 110 on the heel supporting lever 58. In placing a shoe in the jack the upper end of the lever 108 is forced backwards causing the lever 84 to be turned about the stud 82 as a pivot to break the toggle.

During the sewing operation the jack is rotated in a counter clockwise direction through approximately 180° and is then returned to its original position preparatory to receiving a new shoe. Mechanism is provided for causing the shoe holding devices in the jack at this point in the operation automatically to release the shoe so that it may be easily withdrawn by the operator and a new shoe inserted. A vertical shaft 111 having a bracket 112 at the upper end and secured by means of a nut screwed on its lower end is rigidly mounted within the sleeve 48 in the casing 34. which supports the jack. The bracket 112, thus rigidly secured with relation to the casing, carries a gimbal ring pivoted at points 114 which in turn carries a bracket 116 pivoted at 118 at substantially right angles to the common axis of the bearings 114. With this construction the threaded spindle 120 which is formed on the bracket 116 and projects upwardly into the jack is permitted to swing freely about its connections in company with the jack, but is secured rigidly against turning. A nut 122 carrying a cam surface 124 is adapted to turn on the threaded spindle, the pitch of the threads being sufficiently steep so that a small turn will raise the nut a relatively long way. To cooperate with the nut a lever 126 is mounted on the stud 62 and has one arm held yieldingly in engagement with the top of the nut by means of a spring 128 stretched between an eyelet 130 on the lever 126 and an adjustable screw eye 132 on the body portion 32 of the jack. The other arm of the lever 126 carries a bearing surface 134 adapted to come in contact with an arm 136 of the toggle lever 86 and operates to straighten the toggle into a position where it is held by a stop pin 138 on the heel supporting lever 58. The lever 126 also carries a ledge 140 to engage the heel supporting lever 58 and force it away from the toe support 54 against the pressure of the spring 64. A small controlling lever 142 is mounted on the body portion 32 of the jack and is held in engagement with the cam surface 124 of the nut by a spring pressed plunger 144. When the jack is rotated in a counter clockwise direction during the sewing operation, the lever 142 will ride on the cam surface 124 without effect, but as the jack is returned to starting position, the lever engages a projection 146 on the cam causing the nut to rotate about the threaded spindle 120 and through the mechanism above described to open the jack and release the shoe.

The jack is movably mounted in the machine and automatically controlled so that the shoe is presented to the sewing mechanism and maintained in the proper relative position thereto at all times while the stitching progresses around the shoe. When the sewing is completed the jack automatically returns to starting position. The shoe with its supporting jack is moved laterally in the line of feed to transfer the point of operation about the shoe being guided during this movement by the engagement with the stitch receiving channel of the sole of the presser foot 26, which thus cooperates with the shoe contour formed by the channel in determining the outline of the seam on the sole. As the point of operation is transferred about the shoe the jack is tipped about the channel guide as a fulcrum and laterally rotated to position the shoe properly with relation to the sewing mechanism. The lateral movement of the jack to feed the shoe is imparted thereto by devices acting to feed the jack, and the feeding devices of the sewing mechanism which directly engage the shoe and cooperate with the jack moving feeding devices. The sewing mechanism and the positioning mechanism are driven in timed relation to each other, the sewing mechanism being stopped automatically at the end of the seam, while the positioning mechanism continues its operation to turn the jack back to starting position.

The jack supporting structure of the illustrated machine, the jack positioning mechanism and the means for driving this mechanism, and the cam shaft of the sewing mechanism, as well as the means for automatically stopping the sewing mechanism at the end of the seam and continuing the positioning mechanism in operation, are substantially the same as the corresponding parts of the machine disclosed in the patent to Topham and Morrill hereinbefore referred to and will be but briefly described herein.

The lever 36 which carries the jack is mounted to swing vertically about the stud 148, fixed on a support 150, and is supported in an approximately horizontal position by means of a cord 152 having both ends fastened to eyelets 154 on the lever 36, and running over two stationary pulleys 156 mounted above the lever 36 on the machine frame one on each side to permit the lever to swing freely on a horizontal plane. The cord also passes around a pulley 158 mounted on a weight 160 which counter-balances the weight of the jack while permitting it to be moved easily up or down. The support 150 for the jack supporting lever 36 is in turn mounted on a vertical lever 162 to rotate in a plane slightly inclined from the horizontal.

The movement of the support 150 is controlled to swing the jack laterally in the line of feed and to tip the jack about the point of the sewing operation, through connections which include an arm 164 fastened to the lower end of a downwardly projecting portion 166 of the support 150, a bell crank lever 168 mounted on a vertical shaft 170, and a link 172 extending between one arm of the bell crank 168 and the bar 164. The bell crank 168 carries on the other arm a roll 174 adapted to engage the periphery of a cam 176 mounted on the vertical pattern cam shaft 178.

The vertical lever 162 forming part of the mechanism for supporting the jack is forked at its base and is pivotally mounted in the machine by means of bearing pins 180 to swing forwardly and rearwardly. This movement of the lever 162 to move the lower end of the jack transversely to the line of feed and to tip the jack about the point of the sewing operation to conform to the shape of the sole, is controlled by means of a bell-crank lever 182 mounted on the vertical shaft 170, and the connecting link 184 having universal connections with both the bell-crank and the lever 162. Another arm of the bell-crank carries a cam roll 186 to engage the periphery of the cam 188 on the pattern cam shaft 178.

The rotation of the jack pivotally mount on supporting lever 36 as previously described is controlled from a cam 190 mounted on the pattern cam shaft 178 through a bell-crank lever 192 which carries on one arm a cam roll 194 to engage the periphery of the cam, and on the other arm a gear segment 196 meshing with a pinion 198. The pinion is formed as an integral part of the wheel 200, loosely mounted on the shaft 202. In order to cause the jack to turn with the wheel 200 under the influence of the actuating cam 190 the cord 52 is fastened to the wheel and starting from a groove 204 formed in the periphery of the wheel for this purpose, travels around the idle pulley 206 mounted on the arm 36, and from there around the wheel 46 on which the jack is mounted. From this point the cord passes around the idle pulley 208 on the lever 36, and over the idle pulley 210 mounted on a bracket on the machine frame where it is subjected to the strain of a heavy weight 214 as hereinafter described which serves to keep the cord taut at all times. A clip 216 is provided to prevent the cord from slipping about the wheel 46.

The mechanism for actuating the jack to impart feeding movements to the shoe is the same as the corresponding mechanism of the machine disclosed in the Topham and Morrill patent. This mechanism comprises a lever 218, which, for convenience, may be termed the feeding lever, pivoted by means of a stud 220 upon the machine, and a bar 222 connecting said lever with the forward or toe end of the jack. The lever 218 is made up of an upper arm and a relatively short lower arm secured to the lower end of the stud 220 at its rear extremity and fastened to the upper arm by means of a stud 224 at its forward extremity. A flange 226 is provided on the forward end of the feeding lever to act as a support for the bar 222 which is connected to the forward end of the feed lever by a universal joint 228 and to the toe portion of the jack by the universal joint 230.

During the sewing operation the feeding lever 218 is swung toward the left to actuate the jack to advance the marginal portion of the shoe at a substantially uniform rate past the stitch forming devices, or to feed the shoe in conformity with the feeding movements imparted to the shoe by the shoe engaging devices of the sewing mechanism.

The feeding lever 218 is operated in timed relation to the sewing mechanism and the various tipping devices for the jack above described by means of a cam 232 mounted on the pattern cam shaft 178 and intermediate connections which include links 234, and 236, and a bell-crank lever 238 which carries on one of its arms a roll 240 adapted to ride on the periphery of the cam 232. The links 234 and 236 are pivotally connected by a stud 242 mounted on a lever 244, with their loose ends connected respectively to the stud 224 on the feed lever 218 and to the free arm of the bell-crank lever 238. The path of the connection between the links 234 and 236 during the swinging movements of the bell-crank lever 238 is controlled by the lever or controlling arm 244 which is in turn pivotally mounted at its rear end to a stud 246 on the lever 248. This lever 248, which may properly be described as the fulcrum carrying lever, is in the form of a rectangular frame set on edge, the arm 244 engaging between the upper and lower sides of the frame, and is pivoted at the forward end by means of bearing pins 250 on the frame of the machine. During the sewing operation the fulcrum carrying lever 248 is locked in position, thus determining finally the path of the connection between the links 234 and 236 about the stud 246 and the consequent motion imparted to the feeding lever 218.

The cord 52 before mentioned, passes around a pulley mounted on the weight 214 over the stationary pulleys 254 and 256, from there around pulley 258 mounted on the fulcrum carrying lever 248, about a pulley 260 mounted to turn upon the end of the lower bearing pin 250 and is fastened to the stud 224 on the jack feeding lever 218. With this arrangement the weight 214 acting through the cord 52 tends to swing the feeding lever 218 to the right and the rear of the fulcrum carrying lever 248 to the left, and thus tends to swing the cam lever 238 rearwardly. The weight will thus act on the cam lever to maintain the cam roll constantly in contact with the periphery of the corresponding cam disk.

Mechanism similar to that disclosed in the before-mentioned patent to Topham and Morrill is provided which acts upon starting the machine to clamp the fulcrum carrying lever in position, and thus to adjust the throw of the feeding lever to the size of the shoe being operated upon. Mechanism is also provided, as in the machine of the Topham and Morrill patent whereby the adjustment of the fulcrum of the controlling arm 244 in accordance with the size of shoe to limit the throw of the feed lever 218 will operate to adjust a variable speed driving mechanism which is provided to vary the speed of the jack actuating cams with relation to the speed of the sewing devices.

When the machine is started, the fulcrum carrying lever 248 is locked in a position determined as described in the Topham and Morrill patent by the size of the shoe, and an adjustment of the variable speed driving mechanism is then made in accordance with the position of the lever 248. The mechanism through which these adjustments are effected comprises a forwardly extending arm of the lever 248 carrying a cam roll 262 and a controller bar 264 having at one end a notch with spreading jaws 266 to engage the cam roll 262, and hung at the other end to a lever arm 268 mounted on a vertical shaft 270 which is connected to the variable speed mechanism before-mentioned. In order to lock the fulcrum carrying lever 248 in position during the sewing operation a rod 272 is connected at one end with the rear end of the lever 248 and engages in a sleeve 274 pivotally mounted on the machine. A pair of locking levers 276 are pivoted to the sleeve with cam shaped inner ends to engage the rod 272 and carry pins 278 at their outer ends to engage slots formed in the opposite ends of a cross bar 280. The cross bar is in turn yieldingly connected to the controller bar 264 by means of a sleeve 282 pivoted thereon and a link 284 which has a spring connection with the sleeve and is pivotally mounted at its forward end to the controller bar 264.

When the treadle 286 is depressed by the operator to start the machine the bar 288 is moved to the right causing a pin 290 mounted on the bar to engage one arm of the bell crank lever 292 turning the lever about its pivot and causing the controller bar 264 connected to the other arm of the bell crank by a link 294 to be drawn forward. The movement of the controller bar through the yielding connections above outlined causes the fulcrum carrying lever 248 to be locked in position. Then the controller bar 264 is moved to the right or left as the case may be by the action of the cam roll 262 on the jaws 266 until the roll registers with the notch, at the same time causing the lever arm 268 and vertical shaft 270 connected to the right hand end of the controller bar to rotate and adjust the variable speed mechanism in accordance with the position of the fulcrum carrying lever 248.

As has been stated, the sewing mechanism herein disclosed is similar in general design and mode of operation to that disclosed in the patent to Richardson No. 710,612. However, in order to cooperate with the continuous feeding movement of the jack the sewing elements having contact with the work including the needle, presser foot, feed point, and the work supporting horn have been mounted to move back and forth in the line of feed, the needle, presser-foot and horn moving backward during the forward feeding movement of the feed point so that the work is fed continuously through the machine.

The fixed structure of the sewing mechanism consists of a base 298 and two standards 300 and 302 mounted on the base and journalled to receive the sewing cam shaft 27. The mounting for the needle and presser foot comprises a frame 306 suspended from the forward end of the stud 308 which is adapted to turn in a bearing or sleeve 310 mounted on the standard 300 and clamped thereto by means of bolts 312. A collar 314 fastened to the rear end of the stud 308 secures the stud in its bearing. The needle bar 318 is mounted to slide vertically in the frame 306 in brackets 320 and 322, and is driven from the sewing cam shaft 27 as in the machine of the patent to Richardson hereinbefore referred to. The presser foot bar 332 is also mounted to slide vertically on the frame 306 and is held in position by the bracket 320 and by a pin 336 on the frame which engages with a vertical slot 338 in the presser foot bar. The actuating mechanism for the presser foot is the same as in the machine of the Richardson patent.

The feed point 24 is carried on a feeding arm 366 pivotally connected by means of a stud 368 to a lever 370 which is mounted on the presser foot bar 332. A sliding pivot is provided for the upper end of the lever consisting of a pin 372 which engages a slot in the lever, and a limited inclined motion is permitted to the lower end of the lever by the engagement of a pin 376 on the presser foot bar with an inclined slot 378 in the lever the construction being substantially the same as that disclosed in the patent to Richardson No. 1,412,423 dated April 11, 1922. Also, connected to the stud 368 is one end of a link 380, the other end being connected to one arm of the feeding lever 382 which is loosely pivoted on a stud 384 on the standard 300. The other arm carries a cam roll 386 which is constrained to ride on the periphery of the cam disk 388 by the pressure of a spring coiled about the stud 384 and fastened at one end to the hub of the feeding lever and at the other end to a collar fixed to the stud.

The oscillating movement of the frame or mounting 306 for the needle, presser foot and feed point in the line of feed is controlled by means of a gear segment 396 secured on the rear side of the lower part of the frame by the screws 398, and adapted to slide in a groove 400 in the base 298 of the machine. The gear meshes with a corresponding gear segment 402 mounted on the shaft 404 which is oscillated to swing the frame 306 about its pivot 308 by means of an arm 406 fast on the shaft.

The arm 406 is actuated from the cam lever 408 pivoted on the stud 410 on the standard 300 through the link 412 which is pivotally connected at one end to the lever 406 and adjustably secured at the other end in a block 414 mounted on the lower end of the cam lever 408. A roll 416 is mounted on the upper end of the cam lever 408 to ride in the cam groove 418 in the face of the cam 388 which operates to swing the frame 306 back and forth in the line of feed during each revolution of the sewing cam shaft.

The horn 28 is mounted to swing back and forth in the line of feed in unison with the needle and presser foot and for this purpose is mounted on a base 422 which is provided with a horizontally projecting sleeve pivot 424 which is encased in an outer sleeve 426 formed in the machine frame. The horn base 422 is also provided with an upwardly extending arm 428 which has formed on its upper end a gear segment 430 adapted to engage a corresponding gear segment 432 on the hub of the lever 434 mounted on the stud 436. The lever 434 is connected to the cam lever 408 by a link 438 pivoted to the lever 434 by a stud 440 and adjustably held at the other end in a block 441 mounted on the lever 408, so that the needle and presser foot mounting 306 and the horn 28 are caused to swing in unison under the influence of the cam lever 408.

The horn is rotatably mounted in the base 422 and mechanism is provided for rotating it automatically at certain times during the operation on a shoe. The base 422 is provided with a cylindrical socket which receives a corresponding shaped flanged sleeve portion 442 of the horn. A ring 444 clamped to the base 422 by screws 446 holds the horn in position on the base. Rotating or turning movements are imparted to the horn through a bevel gear 452 formed on the lower end of the sleeve 442 which meshes with a corresponding bevel gear mounted on the end of a sleeve 454 journalled within the sleeve 424 of the base 422. On the other end of the sleeve 454 is a pinion 456 which engages a rack 458 slidably mounted in the machine frame. The rack is moved to rotate the horn by a pinion 460 mounted on the forked end of a link 462 to engage between the movable rack 458 and a stationary rack 464. The link 462 is pivotally connected at its other end to the bell crank lever 468 mounted on the stud 470 on the machine frame. Another arm of the bell crank is pivotally connected by a link 472 to the cam lever 474, which carries at its free end a cam roll 478 adapted to engage a switch cam 480 formed in the periphery of the wheel 200 for rotating the jack. Fig. 16 of the drawings is a developed view of the cam 480 showing the switch 482 pivoted near its upper end and pressed downwardly against the cam face by a spring 484.

At the start of the sewing operation, the horn is positioned with the tip pointed toward the heel of the shoe and the cam roll 478 is in the uppermost part of the cam groove 480 as illustrated in Fig. 1. As the point of operation reaches the shank of the shoe the wheel 200 is turned under the influence of the cam 190 to rotate the jack in a clockwise direction and the cam roll is carried downward into the left hand end of the cam groove 480 as viewed in Fig. 16 causing the horn 28 to be rotated through approximately 180 degrees so that the tip projects into the toe of the shoe. Then as the toe is reached and the jack is swung in a counter clockwise direction to present the other side of the shoe to the sewing devices the cam roll will travel to the right in the cam groove passing under the switch 482 to the lowest level of the groove and the horn will turn with the shoe through approximately another 180 degrees in a counter clockwise direction. As the point of operations again reaches the shank of the shoe, the movement of the wheel 200 in turning the jack carries the cam roll 478 into the right hand end of the cam groove 480 and then to the left upwardly along the inclined switch 482 to rotate the horn in a clockwise direction about 180 degrees. Finally when the sewing is completed and the jack is returned to starting position the cam roll 478 is elevated to the top of the incline rotating the horn again in a clockwise direction to its original position with the tip pointing to the left.

Inasmuch as the machine is designed to operate on sharp pointed shoes where the horn cannot be pushed into the extreme tip of the toe, mechanism is provided for momentarily suspending the sewing with the needle withdrawn from the work while the sewing mechanism is transferred around the tip following the usual practice with manually operated machines. It is also desirable that the thread at this point be disengaged from the retracted needle so that instead of forming an exaggerated stitch across the toe which will appear on the tread surface of the sole a single thread is carried across the inside of the shoe. To this end the mechanism for momentarily suspending the sewing at the toe is arranged to stop the whirl slightly in advance of the sewing cam shaft so that no thread is taken by the needle on the last loop drawing stroke.

The driving connections through which the sewing elements in the head and the whirl are driven and stopped in timed relation to each other independently of the jack comprise two inter-connected pin clutches which are geared respectively to the sewing cam shaft and to the whirl. The driving member 488 of the pin clutch for the sewing cam shaft is mounted on the driving shaft 486 and keyed to turn with it by a key 490. The driven member consists of a drum 492 loosely mounted on the driving shaft 486 in contact with the driving member and carrying on its periphery a spiral gear 494. The spiral gear 494 of the driven member of the clutch engages an idle gear 498 which is mounted on a sleeve 500 to turn on a shaft 502. The idle gear in turn meshes with the spiral gear 508 mounted on a sleeve 510 keyed to the sewing cam shaft 27.

The whirl 30 is driven from the driving shaft 486 through a pin clutch which comprises a driving member 514 in the form of a spiral gear loosely mounted on the shaft 516 and adapted to engage with a corresponding gear formed on the periphery of the clutch 488, and a driven member 518 loosely mounted on the shaft 516. The driven member 518 carries a spiral gear 522 adapted to engage a pinion 524 formed on the upper end of the vertical shaft 526 rotatably supported by brackets on the machine frame. On the lower end of the shaft 526 is a pinion 528 which engages a pinion 530 formed on one end of the horizontal shaft 532 extending into the base of the horn. The shaft 532 is connected by means of the gears 534 and 536 to the lower end of a sleeve 538 which has formed on its upper end a gear 540 adapted to engage a gear 542 on the shaft 544 which is in turn connected to the whirl driving shaft 546 through bevel gears 548.

The pin clutches for driving the sewing cam shaft and the whirl are constructed and arranged to disconnect and stop the whirl so that no thread is taken by the needle on its last loop drawing stroke, and then to stop the sewing cam shaft with the needle out of the work. The clutch driving member 488 has an internal cam surface 550 which is adapted to engage with the end portion of a locking pin 552 mounted in the driven member or drum 492. The locking pin is provided with a lever arm 554 and may be turned through a small angle limited by the contact of the lever arm 554 with the ends of its slot 556. A notch 558 is cut in the locking pin so that when the lever 554 is in the forward end of its slot with relation to the direction of rotation of the driving mechanism the pin will engage the cam surface 550 locking the clutch members together, but will be disengaged from the cam surface unlocking the clutch when the lever 554 is in the rear end of its slot. A tension spring 560 attached at one end to a pin in the locking pin 552 and at the other end to a pin on the drum 492 tends to hold the locking pin in locked position.

The pin clutch for driving the whirl (see Figs. 12 and 13) is similarly constructed with an internal cam surface 566 in the driving member 514 and a locking pin 567 to cooperate therewith mounted in the drum 518. A lever arm 568 formed on the locking pin projects out through a slot 570 in the drum limiting the angular movement of the locking pin. A spring 572 tends to hold the pin in locked position with the lever 568 in the forward end of its slot with relation to the direction of rotation of the clutch.

The mechanism for disengaging the pin clutches above described and for stopping the whirl and the sewing cam shaft when the sewing reaches the toe comprises a spring pressed plunger 574 which is secured in a holder 578 loosely mounted on the rock shaft 580 and is adapted to swing into engagement with the locking pin lever 568. Straddling the holder is a forked bracket 582 sleeved to the rock shaft 580 on either side of the holder and fastened rigidly to the shaft by means of a pin 584. A compression spring 586 housed in a recess formed in the bracket tends to swing the holder 578 and plunger 574 into contact with the locking pin lever 568. The movement of the holder with relation to the bracket is limited by the engagement of a hook 590 on the holder with a lug 592 on the bracket. A tension spring 594 stretched between an eye on the bracket 582 and a point in the machine frame tends normally to swing the bracket and holder forward out of the path of the locking pin lever 568. When it is desired to disengage the pin clutches and stop the sewing mechanism the rock shaft 580 is rotated to bring the spring pressed plunger 574 into contact with the locking pin lever 568 forcing it to the rear end of its slot to release the drum 518 from the driving member 514 and locking the drum against further rotation. The locking pin lever 554 of the clutch for the sewing cam shaft now comes into engagement with a stop 596 formed on the drum 518 so that the locking pin lever is forced to the rear end of its slot disengaging the clutch and stopping further rotation of the drum 492. With this arrangement the sewing cam shaft is stopped almost instantly in a predetermined angular position with the needle withdrawn from the work, the shock due to the sudden stopping of the parts being dissipated in a slight yield of the spring plunger 574.

The mechanism for rocking the shaft 580 to throw the clutches into and out of operation as the point of operation rounds the toe of the shoe, comprises a lever arm 598 fastened to the rock shaft 580 and connected through a universal joint to the upper end of a link 600, the lower end of which is connected by another universal joint to one arm of the bell crank lever 602 mounted on a stud 604. The free arm of the bell crank is connected by a link 606 to a lever arm 608 on the vertical rock shaft 610 which carries another lever arm 612 connected by a link 614 to the cam lever 616 pivoted on the vertical shaft 170 and adapted to bear against the periphery of the cam disk 618 on the pattern cam shaft 178. A tension spring 620 stretched between the lower arm of the bell crank 602 and a point on the machine frame tends to hold the cam lever 616 in contact with its cam.

When the sewing is suspended in order to allow the jack feeding devices to shift the point of operation around the toe of the shoe it is also necessary to raise the presser foot from engagement with the work. For this purpose a lever 622 is pivoted on a stud 624 at the side of the base 298 of the sewing machine and is provided with an off set forward end extending under and into engagement with the presser foot lever 340 (see Fig. 4) and is connected back of the pivot stud 624 by a link 630 to the lever arm 598.

In the operation of the machine when the toe is reached the cam 618 acting through the connections described, causes the lever arm 598 to rock bringing the spring pressed plunger 574 into the path of the locking pin lever 568 to stop the sewing mechanism. The lever 598 is then rocked still further by the cam and acts through the link 630 and the lever 622 to raise the presser foot.

After the jack feeding mechanism has transferred the point of operation about the toe the lever arm 598 is returned to its original position by the cam, operating first to release the presser foot and then to swing the spring pressed plunger 574 out of engagement with the locking pin lever 568. The locking pin 567 is now free to turn into locking position under the influence of its spring 572, to drive the whirl, and similarly the pin clutch for the sewing cam shaft is thrown into operation to drive the needle, presser foot, and feeding mechanisms.

After the sewing mechanism is stopped at the end of the seam the presser foot is raised and the jack is lifted out of operating position clear of the horn so that the jack may be returned to its initial position. The mechanism for raising the jack comprises a bar 636 which is connected at its forward end to the jack by means of a universal joint 638 and at its rear end is pivotally secured to a lever 640 pivoted at 642 on the frame of the machine. This bar is substantially the same in construction and arrangement as the corresponding bar of the machine disclosed in the patent to Topham and Morrill hereinbefore referred to, with the exception that it is provided with an upwardly extending hook-like projection 644. This projection is provided on its under side with an inclined surface which is arranged to be engaged by the cross-bar of a slide mounted in a lever 646. This lever 646 with its slide is arranged and actuated in the same manner as the corresponding lever of the machine disclosed in the patent to Topham and Morrill above referred to being given a downward movement into a vertical position after the sewing instrumentalities of the machine have been stopped. As the lever 646 swings to a vertical position the cross bar at the lower end of the slide on the lever engages beneath the hook-like projection 644 and raises the bar 638 and with it the jack so that the shoe is raised free from the horn. The lever 646 is latched in its vertical position in the same manner as the corresponding lever of the Topham and Morrill machine and is released in the same manner by a downward movement of the jack when a new shoe is placed on the jack.

At the same time that the jack is raised, the presser foot is lifted and to accomplish this the lever 646 is connected by a link 654 to the rear end of the lever 622 hereinbefore described. The link 654 has a pin and slot connection with the lever 622, a slot being formed in the upper end of the link through which passes the stud 624 on the rear end of the lever. This pin and slot connection permits free movement of the lever 622 when the lever is actuated to lift the presser foot by means other than the lever 646.

The shoe supporting jack herein disclosed forms the subject-matter of a divisional application filed July 8, 1931, Serial No. 549,377.

The nature and object of the invention having been explained and a machine embodying the various features of the invention having been specifically described, what is claimed is:

1. A shoe sewing machine having, in combination, stitch forming devices including a hook needle, a feed point, a frame on which the needle and feed point are mounted, means for moving the frame forward and backward in the line of feed, and means for moving the feed point with relation to the frame forward and backward in the line of feed, the backward movement of the frame taking place during the forward movement of the feed point.

2. A shoe sewing machine having, in combination, stitch forming devices including a hook needle, a presser foot, a feed point, a frame on which the needle, feed point and presser foot are mounted, means for moving the frame forward and backward in the line of feed, and means for moving the feed point with relation to the frame forward and backward in the line of feed, the backward movement of the frame taking place during the forward movement of the feed point.

3. A shoe sewing machine having, in combination, stitch forming and work feeding devices including a straight hook needle, a horn arranged to extend within the shoe, needle threading mechanism located in the horn, and means for supporting the horn arranged to allow a movement of the horn tip in the line of feed.

4. A shoe sewing machine having, in combination, stitch forming and work feeding devices including a hook needle, a frame on which said devices are mounted, means for moving the frame forward and backward in the line of feed, and means for moving the work feeding device forward and backward with relation to the frame in the line of feed, the backward movement of the frame taking place during the forward movement of the feeding device.

5. A shoe sewing machine having, in combination, stitch forming and work feeding devices including a straight hook needle, a feed point and a presser foot, a frame on which the needle, feed point and presser foot are mounted, a horn arranged to extend within the shoe, needle threading mechanism located in the horn, and pivotal supporting means for the frame and horn arranged to allow the frame and horn to swing in the direction of feed about parallel axes.

6. A shoe sewing machine having, in combination, stitch forming and work feeding devices including a straight hook needle, a horn arranged to extend within the shoe, needle threading mechanism located in the horn, and means for actuating the stitch forming and work feeding devices to sew a seam while imparting a continuous feeding movement to the work.

7. A shoe sewing machine having, in combination, stitch forming and work feeding devices including a straight hook needle, a horn arranged to extend within the shoe, needle threading mechanism located in the horn, means for actuating the stitch forming and work feeding devices to sew a seam while imparting a continuous feeding movement to the work, a jack arranged to move with and support the shoe as the shoe is moved with relation to the horn and stitch forming devices to transfer the point of operation about the shoe, and means for moving the jack in time with the feeding movement of the shoe.

8. A shoe sewing machine having, in combination, sewing elements comprising a straight hook needle, needle threading devices and a work supporting horn arranged to impart a continuous feeding motion to the work, and a shoe supporting jack cooperating with the sewing elements to present the shoe properly to the needle as the point of operation is transferred about the shoe.

9. A shoe sewing machine having, in combination, sewing elements comprising a straight hook needle, a presser foot, a feed point, a horn arranged to extend within the shoe, a needle threading mechanism located in the horn, and actuating mechanism coordinating the relative movements of said elements to sew a seam while imparting a continuous feeding movement to the work.

10. A shoe sole sewing machine having, in combination, a sewing cam shaft, a frame pivoted to swing in the line of feed, a straight hook needle, a feed point and a presser foot mounted on the frame, a work supporting horn arranged to extend within the shoe and mounted to swing with the frame, and means controlled by the sewing cam shaft for swinging the frame and horn in timed relation to the thrust of the needle and to the movement of the feed point to impart a continuous feeding motion to the work.

11. A shoe sole sewing machine having, in combination, a sewing cam shaft, a frame mounted to move in the line of feed, a straight hook needle, presser foot and feed point mounted on the frame, a work supporting horn arranged to extend within the shoe and mounted to move with the frame in the line of feed, needle threading devices contained within the horn, and connections including a cam lever actuated from the sewing cam shaft for moving the frame and horn together in timed relation to the thrust of the needle and to the movement of the feed point to impart a continuous feeding motion to the work.

12. A shoe sole sewing machine having, in combination, sewing elements comprising a straight hook needle, needle threading devices and a work supporting horn arranged to extend within the shoe, and a shoe supporting jack relatively movable to transfer the point of operation about the shoe, and means for throwing the sewing elements into and out of operation during the continued relative movement of the sewing elements and the jack in transferring the point of operation about the shoe to leave the toe portion of the shoe unsewed.

13. A shoe sole sewing machine having, in combination, sewing mechanism comprising a straight hook needle, needle threading devices and a work supporting horn arranged to extend within the shoe, a shoe supporting jack, mechanism for changing the relative positions of the shoe and the sewing mechanism to present the shoe properly to the sewing mechanism as the point of operation is transferred about the shoe, and mechanism acting in timed relation to the position changing mechanism to render the sewing mechanism inoperative at the toe of the shoe.

14. A shoe sole sewing machine having, in combination, sewing mechanism comprising a straight hook needle, a work supporting horn arranged to extend within the shoe, and needle threading devices, a shoe supporting jack, mechanism for changing the relative positions of the shoe and the sewing mechanism to present the shoe properly to the sewing mechanism as the point of operation is transferred about the shoe, and means acting in timed relation to the position changing mechanism for throwing the sewing mechanism into and out of operation during the continued operation of the position changing mechanism to leave the toe portion of the shoe unsewed.

15. A shoe sole sewing machine having, in combination, sewing mechanism comprising a straight hook needle, needle threading devices and a work supporting horn arranged to extend within the shoe, a shoe supporting jack, a pattern cam shaft, mechanism actuated by the cam shaft for changing the relative positions of the jacks and the sewing mechanism during the operation on a shoe, and mechanism actuated by the cam shaft for throwing the sewing elements into and out of operation during the continued relative movement of the sewing elements and the jack to leave the toe portion of the shoe unsewed.

16. A shoe sole sewing machine having, in combination, stitch forming elements comprising a straight hook needle and a needle threading whirl, a work supporting horn containing the whirl arranged to extend within the shoe, and mechanism for stopping the stitch forming elements with the needle withdrawn from the work acting to stop the whirl prior to the stopping of the needle to cause the needle to withdraw free from the thread.

17. A shoe sole sewing machine having, in combination, stitch forming elements comprising a straight hook needle, needle threading mechanism for placing thread in the needle, a work supporting horn containing the needle threading mechanism arranged to extend within the shoe, and mechanism for stopping the stitch forming elements with the needle withdrawn from the work acting to prevent the needle threading mechanism from threading the needle prior to its withdrawal.

18. A shoe sole sewing machine having, in combination, sewing elements comprising a straight hook needle, needle threading devices and a work supporting horn containing the needle threading devices arranged to extend within the shoe, driving mechanism for the sewing elements, and means acting to render the driving mechanism inactive at the toe of the shoe with the needle withdrawn from the work free of the needle thread and thereafter to restore the driving mechanism to active operation.

19. A shoe sole sewing machine having, in combination, stitch forming devices including a straight hook needle and needle threading devices, a work supporting horn containing the needle threading devices arranged to extend within the shoe, mechanism for stopping the stitch forming devices with the needle withdrawn from the work free of the needle thread, and mechanism for stopping the stitch forming devices with the needle withdrawn from the work with a loop of thread in its hook.

20. A shoe sole sewing machine having, in combination, a straight hook needle and needle threading devices, a work supporting horn containing the needle threading devices arranged to extend within the shoe, a shoe supporting jack movable to transfer the point of operation of the stitch forming devices about the shoe, and mechanism for stopping the stitch forming devices with the needle withdrawn from the work free of the needle thread during the continued movement of the jack and for thereafter throwing the stitch forming devices again into operation to leave the toe portion of the shoe unsewed.

21. A shoe sole sewing machine having, in combination, stitch forming devices comprising a straight hook needle and needle threading devices, a work supporting horn containing the needle threading devices arranged to extend within the shoe, a shoe supporting jack movable to transfer the point of operation about the shoe, means for stopping the stitch forming devices with the needle withdrawn from the work free of the needle thread during the continued movement of the jack, and for again throwing the stitch forming devices into operation to leave the toe portion of the shoe unsewed, and means for stopping the stitch forming devices at the completion of the seam with the needle withdrawn from the work with a loop of thread in its hook.

22. A machine for securing the outsoles of shoes having, in combination, fastener inserting mechanism, a horn arranged to extend within the shoe, a jack arranged to move with and support the shoe as the shoe is moved with relation to the horn and fastener inserting mechanism to transfer the point of operation about the shoe, and a guide engaging a contour of the shoe past which the shoe is fed and cooperating with said contour to determine the outline of the line of fasteners inserted in the shoe.

23. A machine for securing the outsoles of shoes having, in combination, fastener inserting mechanism, a horn arranged to extend within the shoe, a jack arranged to move with and support the shoe as the shoe is moved with relation to the horn and fastener inserting mechanism to transfer the point of operation about the shoe, and a guide engaging a fastener receiving channel in the outsole past which the shoe is fed and cooperating with the channel to determine the outline of the line of fasteners inserted in the shoe.

24. A shoe sole sewing machine having, in combination, stitch forming devices including a straight hook needle and needle threading devices, a horn containing the needle threading devices arranged to extend within the shoe, a jack arranged to move with and support the shoe as the shoe is moved with relation to the horn and stitch forming devices to transfer the point of operation about the shoe and a guide past which the shoe is fed arranged to engage a contour of the shoe and cooperating with said contour in determining the outline on the shoe of the seam formed by the stitch forming devices.

25. A shoe sole sewing machine having, in combination, stitch forming devices including a straight hook needle and needle threading devices, a horn containing the needle threading devices arranged to extend within the shoe, a jack arranged to move with and support the shoe as the shoe is moved with relation to the horn and stitch forming devices to transfer the point of operation about the shoe and a guide arranged to engage a stitch receiving channel in the shoe sole and cooperating with the channel in determining the outline on the shoe of the seam formed by the stitch forming devices.

26. A shoe sole sewing machine having, in combination, sewing elements comprising a straight hook needle and needle threading devices, a work supporting horn containing the needle threading devices arranged to extend within the shoe, a shoe supporting jack movable to transfer the point of operation about the shoe, mechanism for turning the jack, and means controlled by the jack turning mechanism for rotating the horn.

27. A shoe sole sewing machine having, in combination, sewing elements comprising a straight hook needle and needle threading devices, a work supporting horn containing the needle threading devices arranged to extend within the shoe, a shoe supporting jack movable to transfer the point of operation about the shoe, a cam shaft, connections including a rotary member actuated from the cam shaft for rotating the jack as the point of operation is moved about the shoe, a cam formed in the rotary member, and means actuated by the cam for rotating the horn in timed relation to the turning movements of the jack.

In testimony whereof I have signed my name to this specification.

ALFRED R. MORRILL.